(12) United States Patent
Daby et al.

(10) Patent No.: US 6,683,749 B2
(45) Date of Patent: Jan. 27, 2004

(54) MAGNETIC TRANSDUCER HAVING INVERTED WRITE ELEMENT WITH ZERO DELTA IN POLE TIP WIDTH

(75) Inventors: Larry E. Daby, Erie, CO (US); James C. Cates, Superior, CO (US); John P. Biesecker, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 225 days.

(21) Appl. No.: 10/034,903

(22) Filed: Dec. 19, 2001

(65) Prior Publication Data

US 2003/0112554 A1 Jun. 19, 2003

(51) Int. Cl.$^7$ .................................................. G11B 5/31
(52) U.S. Cl. .................. 360/125; 29/603.15; 29/603.18
(58) Field of Search ................................. 360/118, 119, 360/125, 126; 29/603.07, 603.13, 603.14, 603.15, 603.16, 603.18; 324/210, 212; 216/22, 66

(56) References Cited

U.S. PATENT DOCUMENTS

| | | | | |
|---|---|---|---|---|
| 4,947,541 A | * | 8/1990 | Toyoda et al. ........... 29/603.14 |
| 5,802,700 A | * | 9/1998 | Chen et al. ............... 29/603.14 |
| 6,069,775 A | * | 5/2000 | Chang et al. ................ 360/126 |
| 6,104,574 A | * | 8/2000 | Takano et al. .............. 360/126 |
| 6,188,544 B1 | * | 2/2001 | Mino .......................... 360/126 |
| 6,339,523 B1 | * | 1/2002 | Santini ........................ 360/317 |
| 6,445,536 B1 | * | 9/2002 | Rudy et al. ................. 360/126 |
| 6,459,542 B1 | * | 10/2002 | Sato ........................... 360/126 |
| 6,477,005 B1 | * | 11/2002 | Sasaki ........................ 360/126 |

* cited by examiner

*Primary Examiner*—David L. Ometz
(74) *Attorney, Agent, or Firm*—Brooks Kushman P.C.

(57) ABSTRACT

A method of fabrication and a magnetic transducer having an inverted write element with a zero delta in pole tip width to provide improved bi-directional control over write track width and written erase bands on media. The transducer includes a top pole and a bottom pole configured to provide the same write track width and relatively small erase bands when either pole is the trailing pole depending on direction of movement of the media relative to the transducer. The bottom pole has an upper portion and a lower portion. The bottom pole upper portion width is less than the bottom pole lower portion width. The top pole has a main portion formed opposite to the bottom pole upper portion. The top pole main portion has a main portion width which is equal to the bottom pole upper portion width.

3 Claims, 7 Drawing Sheets

MAGNETIC TRANSDUCER HAVING INVERTED WRITE ELEMENT WITH ZERO DELTA IN POLE TIP WIDTH

BACKGROUND OF THE INVENTION

1. Field of the Invention

The present invention relates generally to thin film magnetic transducers used to read and write data to magnetic storage media and, more particularly, to a magnetic transducer having an inverted write element with a zero delta in pole tip width.

2. Background Art

Magnetic storage media such as tape increasingly use narrow track widths in order to increase the amount of data that can be recorded. Narrow track widths require tight control of the dimension and shape of a magnetic write transducer's top and bottom poles near and at a write gap. Narrow track widths lead to reduced recorded track pitch and tighter tolerances on write track width and the written erase bands that occur at the write track edges. As the magnetic storage media moves relative to a magnetic write transducer, it is generally the trailing pole of the magnetic write transducer (i.e., the top pole or the bottom pole dependent on the direction of motion of the magnetic storage media) that determines the effective size of the track width written on the magnetic storage media.

Accordingly, what is needed is a magnetic transducer which provides improved control over the write track width and the written erase bands. It would be desirable if such a magnetic transducer provided the same write track width in both directions of movement of the magnetic storage media relative to the magnetic transducer while providing relatively small erase bands. In such case, the magnetic transducer would provide the same track width regardless of whether the top pole or bottom pole is the trailing pole while providing relatively small erase bands.

SUMMARY OF THE INVENTION

It is an object of the present invention to provide a magnetic transducer having an inverted write element with a zero delta in pole tip width.

It is another object of the present invention to provide a magnetic transducer having an inverted write element with a zero delta in pole tip width which provides improved control over the write track width and the written erase bands.

It is a further object of the present invention to provide a magnetic transducer having an inverted write element with a zero delta in pole tip width which provides the same write track width in both directions of movement of magnetic storage media relative to the magnetic transducer while providing relatively small erase bands.

It is still another object of the present invention to provide a magnetic transducer having an inverted write element including a top pole and a bottom pole configured to provide the same write track width and relatively small erase bands when either the top pole or bottom pole is the trailing pole.

It is still a further object of the present invention to provide a method of fabricating a magnetic transducer in accordance with the objects set forth above.

In carrying out the above objects and other objects, the present invention provides a magnetic transducer including a bottom pole and a top pole. The bottom pole has an upper portion and a lower portion. The bottom pole upper portion has an upper portion width and the bottom pole lower portion has a lower portion width. The bottom pole upper portion width is less than the bottom pole lower portion width. The top pole has a main portion formed opposite to the bottom pole upper portion. The top pole main portion has a main portion width. The top pole main portion width is substantially equal to the bottom pole upper portion width. A write gap layer is interposed between the top pole main portion and the bottom pole upper portion.

Further, in carrying out the above objects and other objects, the present invention provides a method of fabricating a magnetic transducer. The method includes forming a bottom pole having an upper portion and a lower portion. The bottom pole upper portion has an upper portion width and the bottom pole lower portion has a lower portion width. The bottom pole upper portion width is less than the bottom pole lower portion width. The method further includes forming a top pole having a main portion opposite to the bottom pole upper portion. The top pole main portion has a main portion width which is substantially equal to the bottom pole upper portion width.

Prior to the step of forming a top pole, the method may further include depositing a write gap, layer on the bottom pole and then forming the top pole such that the write gap layer is interposed between the top pole main portion and the bottom pole upper portion.

Forming the top pole may include forming a top pole side portion on each side of the top pole main portion offset from the top pole main portion in a direction away from the bottom pole. Prior to the step of forming a top pole, the method may include forming an electrical insulating layer on each side of the bottom pole upper portion at a level above the bottom pole upper portion and then forming the top pole side portions over the electrical insulating layer. The electrical insulating layer may include alumina. The method may include depositing a write gap layer on the electrical insulating layer and the bottom pole upper portion and then forming the top pole such that the write gap layer is interposed between the top pole main portion and the bottom pole upper portion and is interposed between the top pole side portions and the electrical insulating layer.

Still further, in carrying out the above objects and other objects, the present invention provides a magnetic transducer including a bottom pole, an electrical insulating layer, and a top pole. The bottom pole has an upper portion and a lower portion. The bottom pole upper portion has an upper portion width and the bottom pole lower portion has a lower portion width. The bottom pole upper portion width is less than the bottom pole lower portion width. The electrical insulating layer is on each side of the bottom pole upper portion width at a level above the bottom pole upper portion. The top pole has a main portion opposite to the bottom pole upper portion. The top pole main portion has a main portion width which is substantially equal to the bottom pole upper portion width. The top pole further has a side portion on each side of the top pole main portion width. The top pole side portions are formed opposite to the electrical insulating layer such that the top pole side portions are offset from the top pole main portion in a direction away from the level above the bottom pole upper portion. A write gap layer may be interposed between the top pole main portion and the bottom pole upper portion and may be interposed between the top pole side portions and the electrical insulating layer.

The bottom pole upper portion width defines a first write track width when the bottom pole is a trailing pole and the top pole main portion width defines a second write track width when the top pole is the trailing pole. The first and second write track widths are substantially equal as the bottom pole upper portion width and the top pole main portion width are substantially equal.

A magnetic write fringing field extends between the bottom pole upper portion and the top pole main portion when a magnetic writing signal is induced. The write fringing field extending non-perpendicularly between the bottom pole upper portion and the top pole are minimized as a result of the top pole side portions being formed offset from the top pole main portion in a direction away from the level above the bottom pole upper portion.

The advantages associated with the present invention are numerous. For example, the inverted write element with a zero delta in pole tip width provides improved bi-directional write track width control while providing an opportunity for improved control of the written erase bands. Thus, the write track width in both directions of magnetic storage media movement are roughly the same while the written erase bands are relatively small. These features improve the track mis-registration budget thereby permitting higher track densities.

The above objects and other objects, features, and advantages of the present invention are readily apparent from the following detailed description when taken in connection with the accompanying drawings.

DETAILED DESCRIPTION OF THE PREFERRED EMBODIMENTS

Several terms are used in this specification in a generic sense. The term "forming" is meant to include any combination of fabrication steps that result in the deposition and patterning of a layer. This includes depositing a layer followed by a subsequent patterning using a masking layer to control the removal of unwanted material. It also includes the deposition of a patterning mask layer used to control a subsequent deposition. The term "deposition" is any method of creating a layer of material over an existing surface. Deposition includes sputtering, evaporating, chemical vapor deposition, plating, and other like methods known in the art. The term "patterning" is any method of defining a geometric area or areas where a layer will or will not exist, or will exist in a thinner form. Patterning includes wet chemical etching, electro-machining, lift off techniques, ion milling, focused ion beams, and other like methods used in the art.

Figure 1:
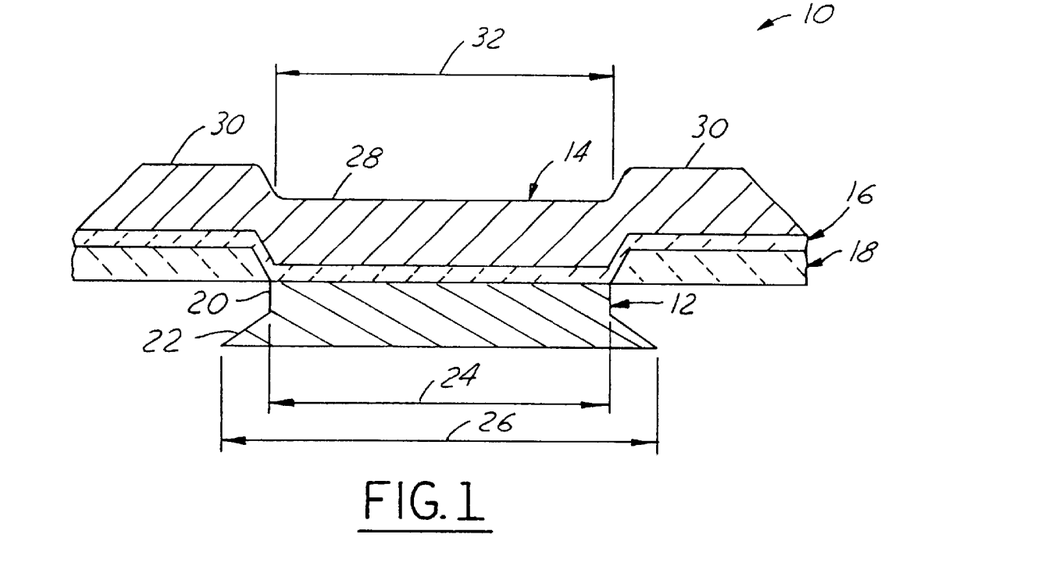
FIG. 1 illustrates a profile of a magnetic transducer in accordance with the present invention as seen from a magnetic storage media bearing surface.

Referring now to FIG. 1, a profile of a magnetic transducer 10 in accordance with the present invention as seen from a magnetic storage media bearing surface is shown. Magnetic transducer 10 generally includes a bottom pole 12, a top pole 14, a write gap layer 16, and an electrical insulating material such as alumina layer 18. Bottom pole 12 includes an upper portion 20 and a lower portion 22. Bottom pole upper portion 20 has an upper portion width 24. Bottom pole lower portion 22 has a lower portion width 26. Lower portion width 26 is greater than upper portion width 24.

Top pole 14 includes a main portion 28 and two side portions 30. Top pole main portion 28 is formed opposite of bottom pole upper portion 20. Top pole main portion 28 has a main portion width 32 which is substantially equal to upper portion width 24 of bottom pole 12 and less than lower portion width 26 of the bottom pole. Top pole side portions 30 extend from respective sides of top pole main portion 28 on each side of main portion width 32 of top pole 14. Consequently, top pole side portions 30 extend on each side of upper portion width 24 of bottom pole 12. Top pole side portions 30 are formed offset from top pole main portion 28 in a direction away from bottom pole 12.

Alumina layer 18 is formed at a level above bottom pole 12 at each side of upper portion width 24 of the bottom pole to lie opposite of top pole side portions 30. Write gap layer 16 is interposed between top pole main portion 28 and bottom pole upper portion 20 and is interposed between top pole side portions 30 and alumina layer 18.

Magnetic transducer 10 has the appearance of having an inverted bottom pole because bottom pole upper portion 20, lying opposite from top pole main portion 28, has a smaller width 24 than width 26 of bottom pole lower portion 22. When storage media is moving in a first direction relative to magnetic transducer 10, bottom pole 12 is the trailing pole and upper portion width 24 of the bottom pole defines the write track width on the magnetic storage media. When storage media is moving in a direction opposite to the first direction relative to magnetic transducer 10, top pole 14 is the trailing pole and top pole main portion width 32 defines the write track width on the storage media. Because bottom pole upper portion width 24 and top pole main portion width 32 are equal in width, the write track width defined on the storage media is the same in both directions of storage media movement.

A preferred material for bottom pole 12 and top pole 14 is a cobalt zirconium tantalum (CZT) alloy. Bottom pole 12 and top pole 14 are deposited to a thickness of approximately three to five micrometers. Various nickle iron alloys, such as 45:55 NiFe and 50:50 NiFe, iron nitride alloys, and nickle iron alloys may also be used in place of the CZT alloy.

Figure 2:
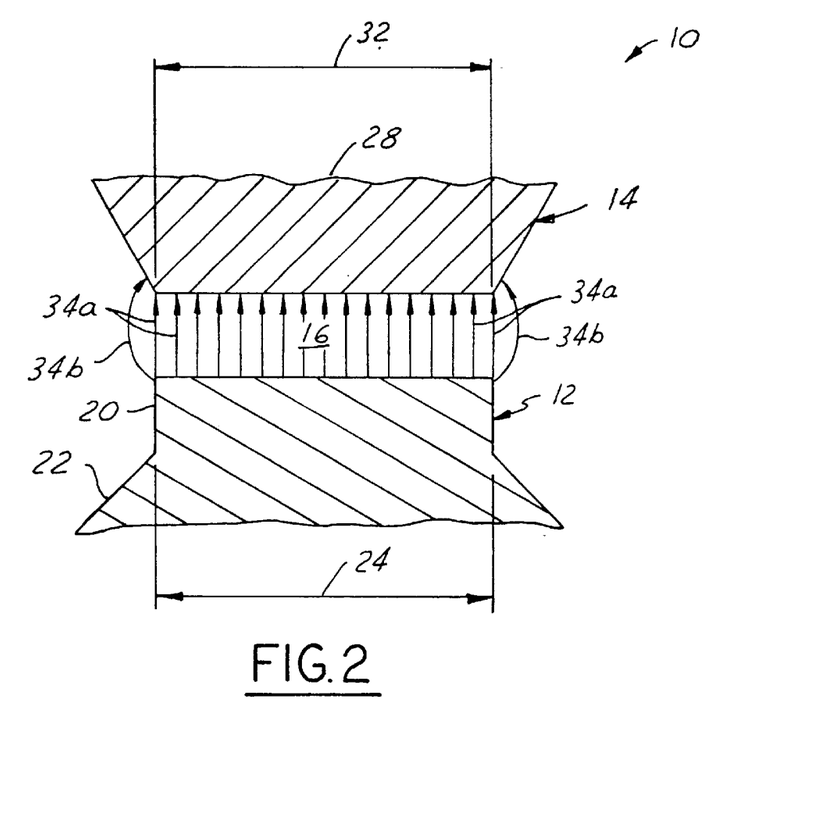
FIG. 2 illustrates the write fringing field produced by the magnetic transducer shown in FIG. 1.

Referring now to FIG. 2, with continual reference to FIG. 1, the write fringing field produced by magnetic transducer 10 is represented with magnetic field lines. Write field lines 34 extend through write gap layer 16 between bottom pole 12 and top pole 14 when a write signal is induced. Specifically, write field lines 34 extend through write gap layer 16 between bottom pole upper portion 20 and top pole main portion 28 when a write signal is induced. Between bottom pole upper portion width 24 and top pole main portion width 32, i.e., between the track edges, write field lines 34 such as write field lines 34a extend perpendicularly through write gap layer 16 between bottom pole 12 and top pole 14. As a result of only top pole main portion 28 being formed opposite to bottom pole 12 and top pole side portions 30 being formed offset away from the bottom pole, a near minimal strength of write field lines 34 such as write field line 34b extend non-perpendicularly through write gap layer 16 between the bottom pole and top pole 14 at the track edges.

The magnitude of the non-perpendicular write field lines 34b at the track edges is near minimal because top pole main portion width 32 is equal to bottom pole upper portion width 24 and top pole side portions 30 are formed offset away from the bottom pole. Because of the near minimal magnitude of non-perpendicular write field lines 34b at the track edges, the written erase bands produced at the track edges is relatively smaller than when larger non-perpendicular write field lines exist at the track edges. Higher magnitude non-perpendicular write field lines exist at the track edges when top pole main portion width 32 is significantly different than bottom pole upper portion width 24 and/or top pole side portions 30 are not formed offset with respect to bottom pole 12. Accordingly, magnetic transducer 10 provides the same written track width in both directions of magnetic storage media movement while providing relatively small written erase bands.

Figure 3:
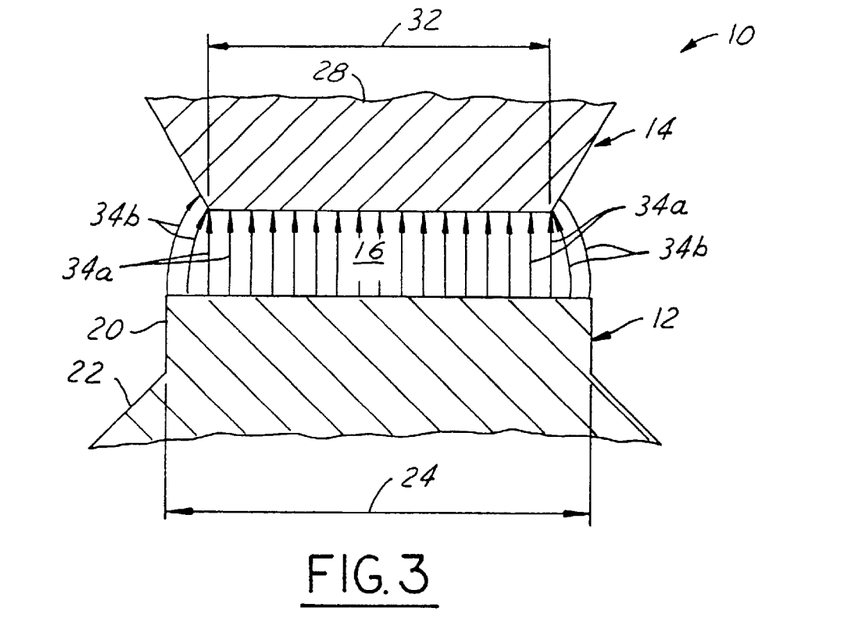
FIG. 3 illustrates the write fringing field produced by the magnetic transducer shown in FIG. 1 when the top pole track width at the write gap edges is shortened relative to the bottom pole track width.

Referring now to FIG. 3, with continual reference to FIGS. 1 and 2, the write fringing field produced by magnetic transducer 10 when top pole main portion width 32 has been shortened at the write gap edge with respect to bottom pole upper portion width 24 is shown. In general, top pole main portion width 32 may be widened, shortened, or shifted relative to bottom pole upper portion width 24 to optimize the written erase bands for a particular recording system and write gap. That is, top pole main portion width 32 may be widened, shortened, or shifted relative to bottom pole upper portion width 24 to modify magnitude and shape of non-perpendicular write field lines 34b at the track edges if desired.

Figure 4:
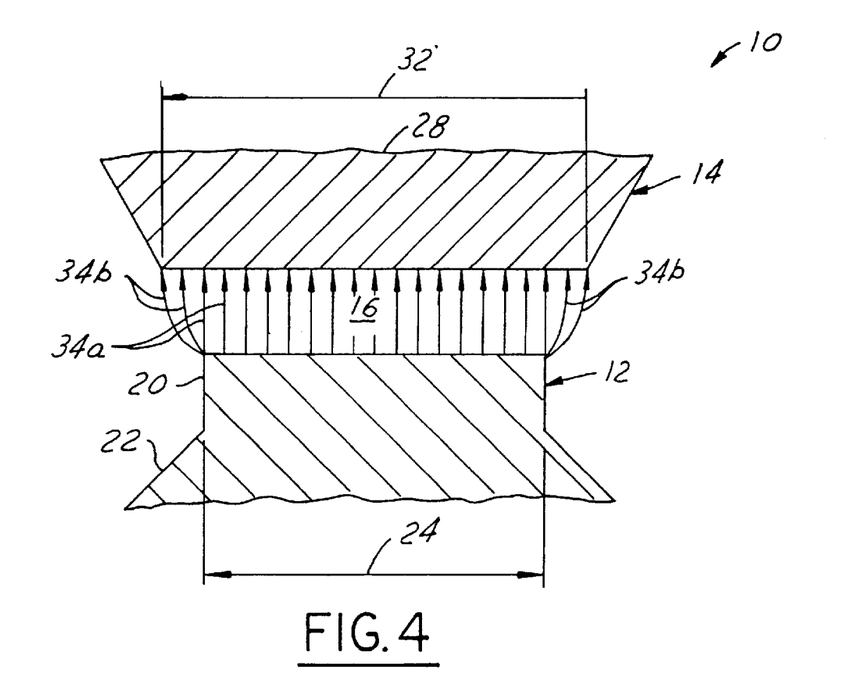
FIG. 4 illustrates the write fringing field produced by the magnetic transducer shown in FIG. 1 when the top pole track width at the write gap edges is widened relative to the bottom pole track width.

As shown in FIG. 3, top pole main portion width 32 has been shortened as compared to bottom pole upper portion width 24, i.e., the top pole main portion width is offset inward at the write gap edges. FIG. 4 illustrates the reverse situation when top pole main portion width 32 has been widened as compared to bottom pole upper portion width 24, i.e, the top pole main portion width is offset outward at the write gap edges.

With reference to FIG. 1, the general fabrication process of magnetic transducer 10 in accordance with the present invention is as follows. Bottom pole 12 is deposited to a desired thickness. Bottom pole 12 is then patterned using conventional photo-resist patterning and film definition processes such that the bottom pole is formed to be inverted with an inverted bottom pole upper portion width 24. A lap strap layer of Ti/Cr (not shown) is then deposited followed by the deposition of alumina layer 18 over bottom pole 12 and on each side of the bottom pole. Alumina layer 18 is then defined and milled with the Cr layer serving as a mill stop such that bottom pole upper portion 20 is exposed while alumina layers remained formed at a level above the bottom pole upper portion on each side of the bottom pole upper portion. The patterning of alumina layer 18 is done on a planar surface, yielding proper dimensional control. Write gap layer 16 is then deposited over the remaining alumina layers 18 and bottom pole upper portion 20. The write element is then finished by using a typical write element process without the need for tight dimensional control such that top pole main portion width 32 is equal to bottom pole upper portion width 24 and top pole side portions 30 are offset in a direction away from bottom pole 12.

Figure 5:
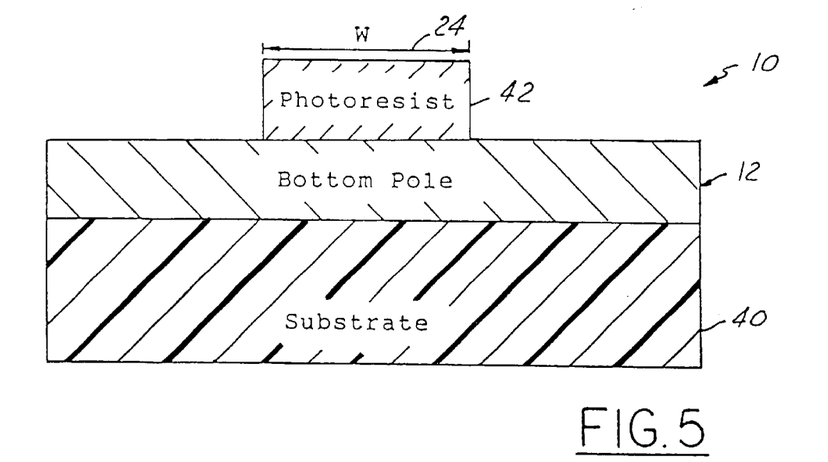
FIGS. 5, 6, 7, 8, 9, 10, and 11 illustrate the general description of the steps for fabricating the magnetic transducer shown in FIG. 1.
Figure 6:
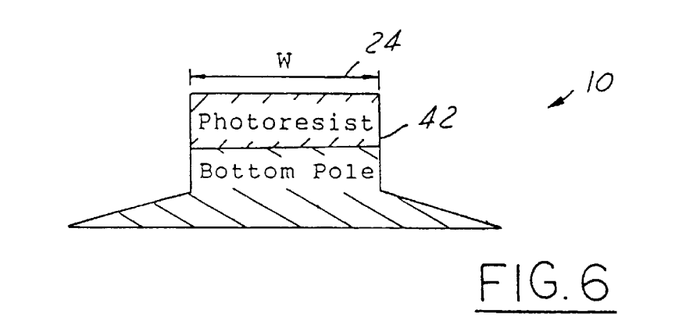
Figure 7:
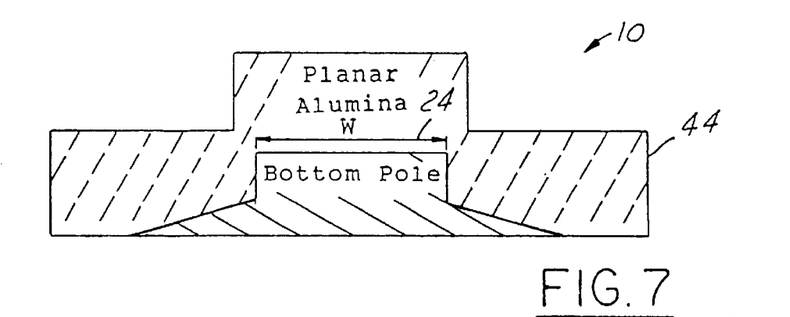
Figure 8:
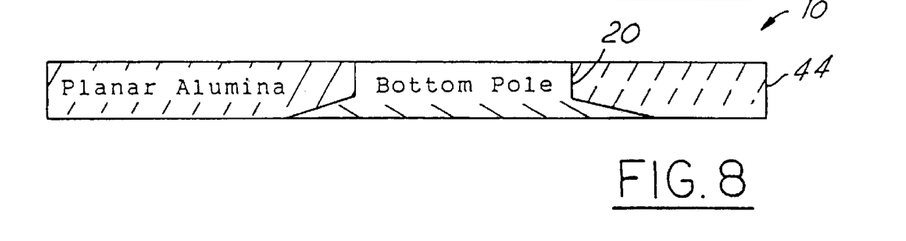

Referring now to FIGS. 5, 6, 7, 8, 9, 10, and 11 the general description of the fabrication process of magnetic transducer 10 in accordance with the present invention will be described in more detail. Initially, as shown in FIG. 5, bottom pole 12 is deposited on a substrate 40. A photo-resist layer 42 having a width 24 (i.e., the same width as bottom pole upper portion width 24) is then patterned on bottom pole 12. As shown in FIG. 6, the inverted pattern of bottom pole 12 is ion milled. As shown in FIG. 7, the perimeter shapes are etched and planar alumina 44 is deposited over inverted bottom pole 12. As shown in FIG. 8, the surface of planar alumina and inverted bottom pole 12 is chemically and mechanically polished flat such that bottom pole upper portion 20 is exposed.

Figure 9:
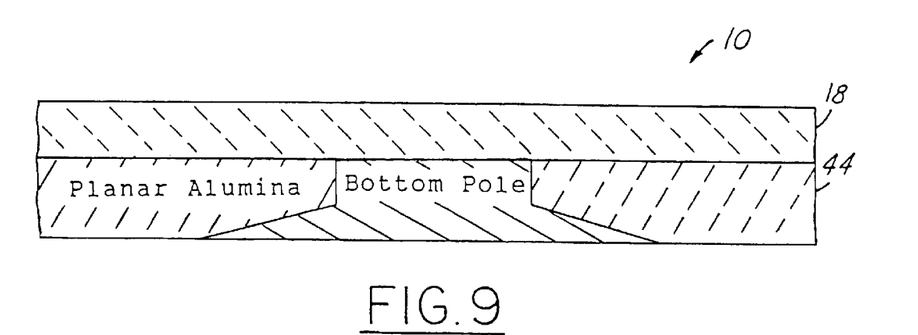
Figure 10:
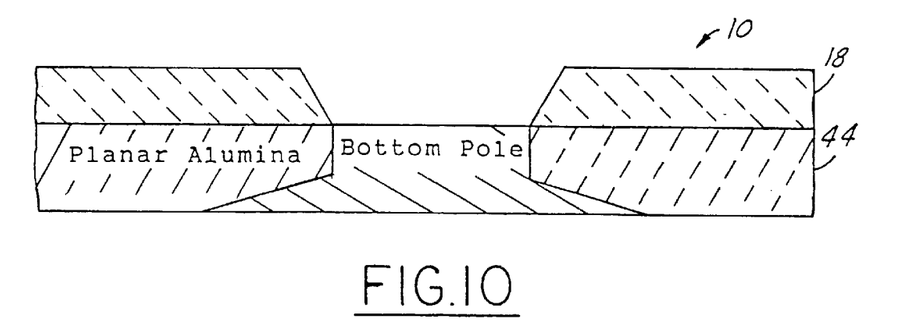
Figure 11:
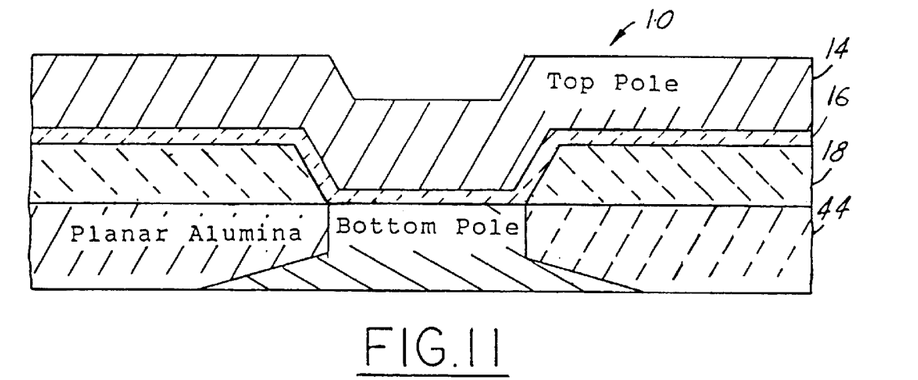

A lap strap layer of Ti/Cr (not shown) is then deposited over the exposed bottom pole upper portion 20 and planar alumina layer 44. The Ti/Cr layer is then defined and milled with the Cr layer serving as a mill stop. Next, as shown in FIG. 9, alumina layer 18 is deposited over bottom pole upper portion 20 and planar alumina layer 44. As shown in FIG. 10, alumina layer 18 is then defined and milled such that bottom pole upper portion 20 is again exposed and alumina layers 18 are formed on each side of bottom pole upper portion at a level above the bottom pole upper portion. As shown in FIG. 11, write gap layer 16 is then deposited over bottom pole upper portion 20 and alumina layer 18. Top pole 14 is then deposited over write gap layer 16. It is noted that top pole side portions 30 may be reduced in size than as shown in the FIGS. or even eliminated.

Figure 12A:
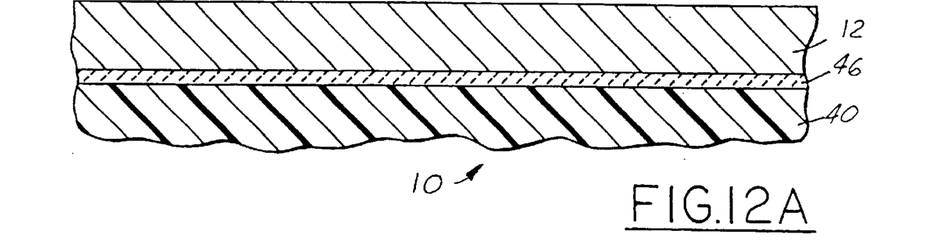
FIGS. 12A, 12B, and 12C illustrate a first sequence of fabrication steps for forming the magnetic transducer shown in FIG. 1.
Figure 12B:
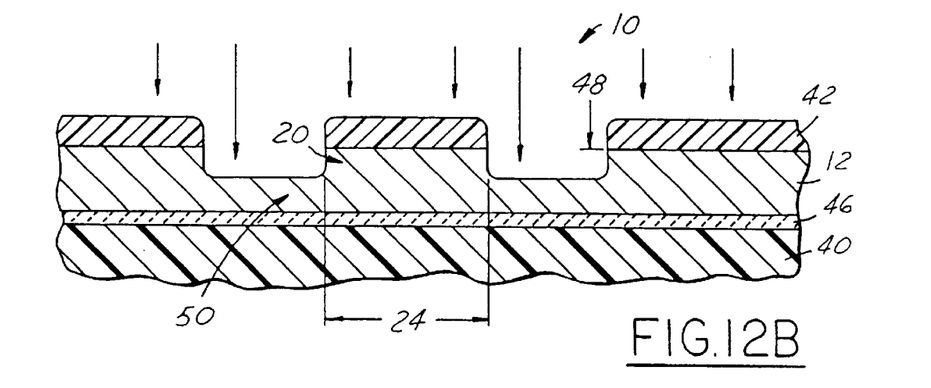
Figure 12C:
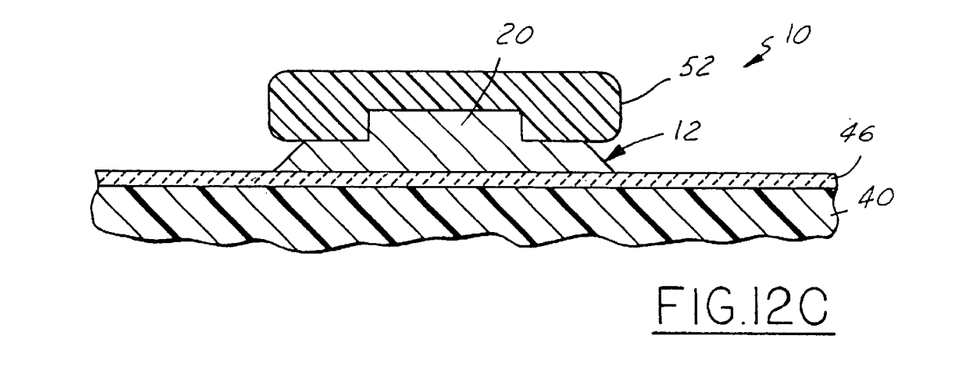

Referring now to FIGS. 12A, 12B, and 12C, a more detailed description of the fabrication process of magnetic transducer 10 in accordance with the present invention will now be described. Initially, as shown in FIG. 12A, an electrically insulating undercoat layer 46 is deposited over substrate 40. A lapping strap seed layer (not shown) is then formed on undercoat layer 46 to produce resistive elements. The lapping strap seed layer is used later in the fabrication process to monitor the progress of a final lapping step. Bottom pole 12 is then deposited following the formation of the lapping strap seed layer. Preferably, deposition is by vacuum deposition followed by annealing.

Referring now to FIG. 12B, photo-resist mask 42 is deposited, exposed, and developed overlaying bottom pole 12. Ion milling is then performed using photo-resist mask 42 to shield areas of bottom pole 12 that are not to be milled. In particular, bottom pole upper portion 20 in what will be part of a zero throat region 78 (see FIG. 16) of magnetic transducer 10 is protected by photo-resist mask 42 from ion milling. As described above, bottom pole upper portion 20 has a width 24 that will ultimately control the track width on magnetic storage media when bottom pole 12 is the trailing pole. Ion milling is performed to produce a bottom pole upper portion thickness, as indicated by arrow 48, having a target value. A remainder layer 50 of bottom pole 12 is left unmilled around bottom pole upper portion 20. After ion milling, photo-resist mask 42 is stripped.

Figure 13:
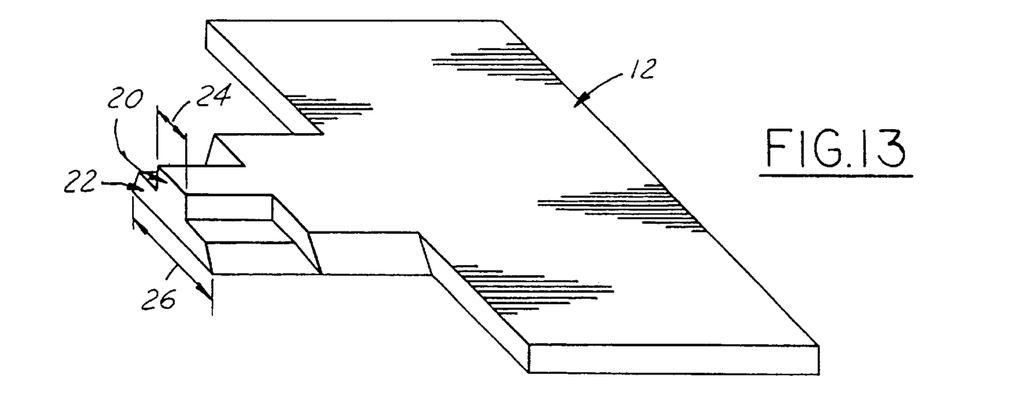
FIG. 13 illustrates a perspective view of the bottom pole of the magnetic transducer shown in FIG. 1.

Referring now to FIG. 12C, a second photo-resist mask 52 is deposited, exposed, and developed overlaying bottom pole 12. Second photo-resist mask 52 covers bottom pole upper portion 20 and slightly overlaps bottom pole remainder layer 50 immediately adjoining the bottom pole upper portion. An etch is then performed through second photo-resist mask 52 to remove unwanted areas of remainder layer 50. This leaves each bottom pole 12 isolated from its neighbors. After the second photo-resist mask 52 is stripped, the resulting bottom pole 12 appears as shown in FIG. 13.

Alternatively, the ion milling may be performed around the entire perimeter of bottom pole 12, instead of just in zero throat region 78. Furthermore, the ion milling shown in FIG. 12B may be continued until the entire thickness of bottom pole 12 is milled. This makes second photo-resist mask 52 and the subsequent etching step shown in FIG. 12C unnecessary.

Figure 14A:
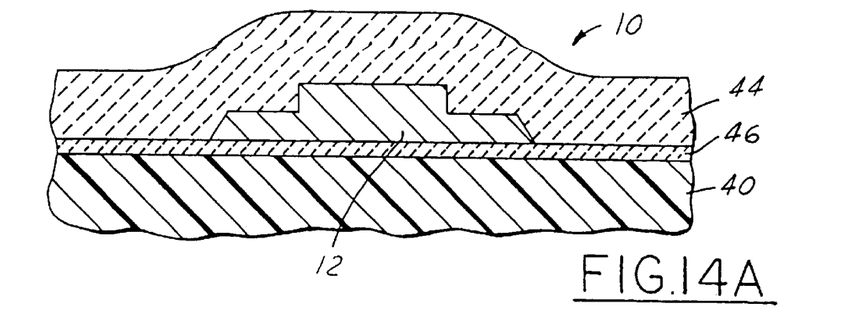
FIGS. 14A, 14B, and 14C illustrate a second sequence of fabrication steps for forming the magnetic transducer shown in FIG. 1.
Figure 14B:
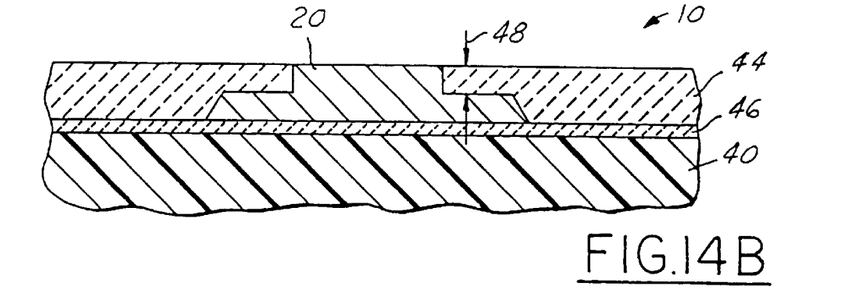

Referring now to FIG. 14A, planarization layer 44 is deposited overlaying bottom pole 12. Planarization layer 44 is made of alumina, although other nonmagnetic electrically isolating materials could be used. Planarization layer 44 is then lapped using a chemical mechanical polishing or other compatible processes to expose bottom pole upper portion 20 as shown in FIG. 14B. At this point all of planarization layer 44 should be removed from immediately above bottom pole upper portion 20. However, due to variations in processing and material thickness at various points on the wafer, some planarization layer 44 may remain overlaying some of bottom pole 12. To ensure that bottom pole 12 is exposed, lapping is continued to remove a small amount of bottom pole 12 as shown by the phantom line in FIG. 14C. This produces a proper surface to form write gap layer 18.

Figure 14C:
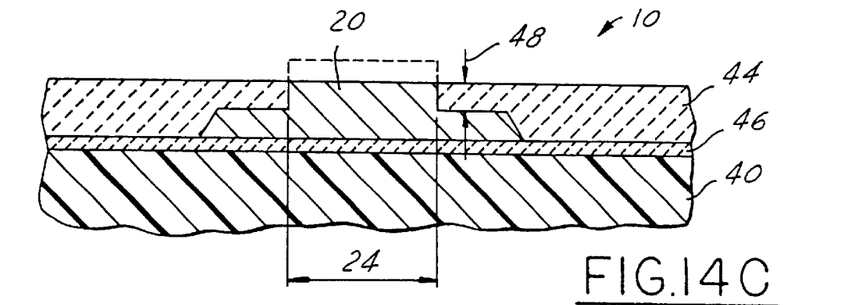

Initially, bottom pole upper portion 20 is milled to the upper portion thickness 48 having the target value. Lapping reduces upper portion thickness 48 to a final value. Ideally, upper portion thickness 48 should be at least twice as large as the thickness of write gap layer 18. This allows bottom pole upper portion 20 to dominate the write track width characteristics of magnetic transducer 10.

At this point in the fabrication process, upper portion width 24 is measured to determine if it is in compliance with a predetermined dimension and tolerance. Where upper portion width 24 is found out of tolerance, then the fabrication process is terminated. Here, bottom pole 12 and planarization layer 44 are stripped and the process started over. This process allows errors in bottom pole upper portion width 24 to be detected early in the fabrication cycle thus reducing wasted costs associated with completing the fabrication steps before the error is found.

Figure 15A:
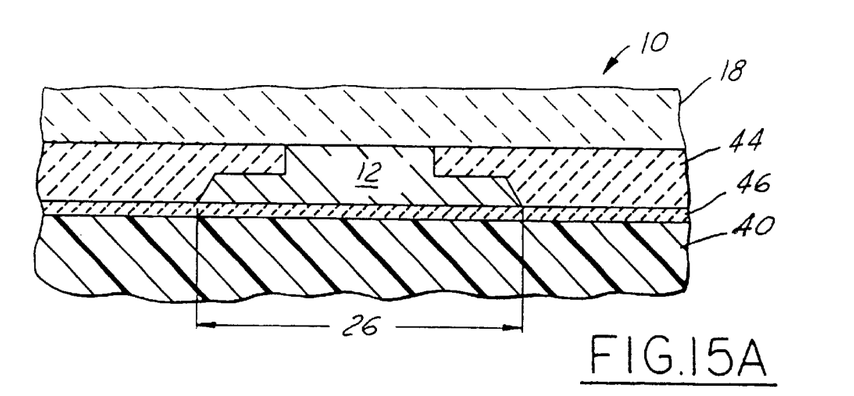
FIGS. 15A, 15B, and 15C illustrate a third sequence of fabrication steps for forming the magnetic transducer shown in FIG. 1.
Figure 15B:
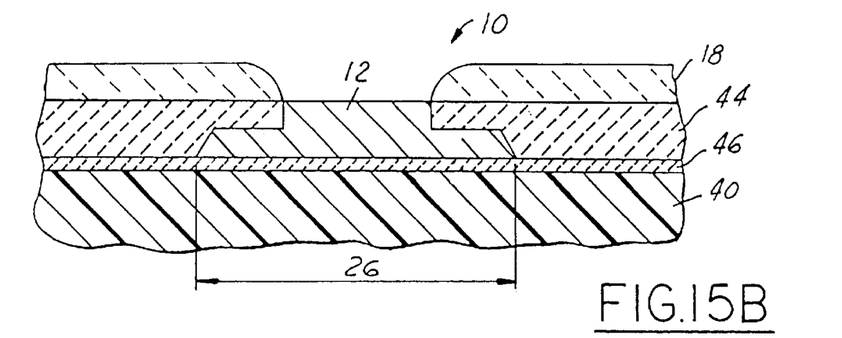

Referring now to FIG. 15A, a lap strap layer of Ti/Cr (not shown) is deposited over bottom pole upper portion 20 and planarization layer 44. This lap strap layer is then defined and milled with the Cr being used as a mill stop. Alumina layer 18 is then deposited over bottom pole upper portion 20 and planarization layer 44. Alumina layer 18 is then defined and milled as shown in FIG. 15B such that bottom pole upper portion 20 is exposed.

Figure 15C:
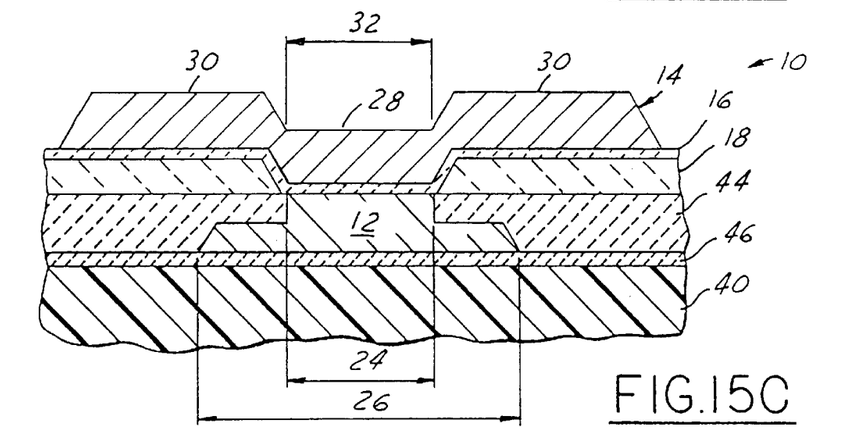

As shown in FIG. 15C, write gap layer 16 is then deposited over bottom pole upper portion 20 and alumina layer 18. Write gap layer 16 is then defined and etched. Write gap layer 16 is typically, but not necessarily, a sputtered alumina material. Subsequently, top pole 14 is deposited over write gap layer 16 and then defined and etched. Thus, the completed magnetic transducer 10 as seen from a magnetic storage media bearing surface is shown in FIG. 15C after completion of the above-described fabrication steps.

Figure 16:
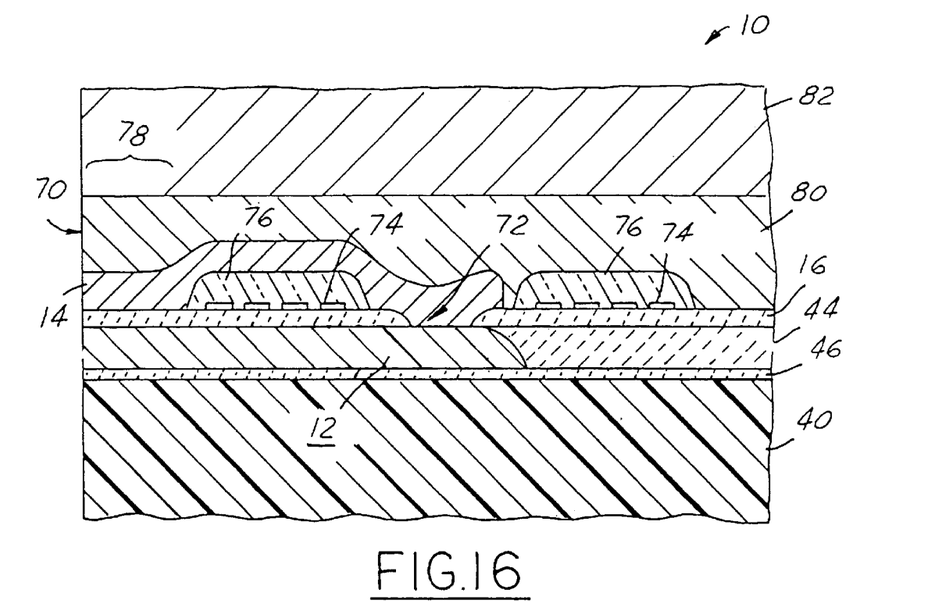
FIG. 16 illustrates a profile of the magnetic transducer shown in FIG. 1 as seen perpendicular to a storage media bearing surface.

Referring now to FIG. 16, a profile of magnetic transducer 10 as seen perpendicular to a storage media bearing surface is shown. FIG. 16 also illustrates some fabrication processes not mentioned above which take place after deposition and etching of write gap layer 16 and before deposition and etching of top pole 14. As shown in FIG. 16, write gap layer 16 forms a write gap or break in the magnetic yoke formed by bottom pole 12 and top pole 14. A write signal induced in the magnetic yoke generates a write field represented with magnetic field lines 34 across write gap layer 16 at a media bearing surface 70. The fringing write field is used to write data to the magnetic storage media positioned at media bearing surface 70. Write gap layer 16 is patterned to open a back gap via 72 that allows top pole 14 to connect with bottom pole 12 thereby completing the magnetic yoke.

Coils 74 are then formed on write gap layer 16. Coils 74 are covered by coil insulating layers 76. Coil insulating layers 76 are patterned so as to not cover write gap layer 16 in zero throat region 78, back gap 72 where bottom pole 12 and top pole 14 meet, and the ends of coils 74. Coil insulating layers 76 provide electrical isolation between individual windings of coils 74 and top pole 12. Electrical isolation between coils 74 and bottom pole 12 is provided by write gap layer 16. Coils 74 are made of copper plated in the presence of a photo-mask (not shown). Other electrical conductors such as gold, and other deposition and patterning methods may also be used to form coils 74. An insulating layer (not shown) may be deposited on write gap layer 16 and patterned prior to forming coils 74. This insulating layer provides an enhanced level of electrical isolation between coils 74 and bottom pole 12.

Next, another cleaning is performed to insure write gap layer 16 in zero throat region 78 is clear of any residue from the previous process steps. This cleaning is followed by a deposition of top pole 14. Top pole 14 is usually, though not necessarily, the same magnetic material as used to form bottom pole 12. Top pole 14 is a layer of CZT deposited by sputtering.

A photo-resist mask (not shown) is then deposited, exposed, and developed over top pole 14. This photo-resist mask is used to define the shape of top pole 14 during a subsequent etch. The resulting top pole 14 has a top pole main portion width 32 that is equal to the bottom pole upper portion width 24. Both top pole main portion width 32 and bottom pole upper portion width 24 are less than bottom pole lower portion width 26.

Various deposition and patterning processes may be used to create the top pole 14. For example, sputtering, evaporation, chemical vapor deposition and other deposition process known in the art may be used to establish top pole 14. Patterning methods such as lift off, focused ion beam milling and other patterning methods known in the art may be used to define top pole 14.

When formation of top pole 14 has been completed, an overcoat layer 80 is deposited as shown in FIG. 16. Overcoat layer 80 is typically made of alumina material. After deposition, overcoat layer 80 is lapped flat to prepare the uppermost surface for formation of bonding pads (not shown).

Each magnetic write transducer on substrate 40 is then electrically tested to identify operational and non-operational transducers. Next, individual transducers or arrays of transducers, depending upon the desired configuration, are cut from substrate 40. For magnetic tape applications, the transducers are then mounted with a top closure 82. Finally, media bearing surface 70 is lapped to produce a finished surface. During this final lapping step, the resistance of the resistive elements formed in the lapping strap seed layer are monitored to determine how far the lapping has encroached on zero throat region 78.

Thus it is apparent that there has been provided, in accordance with the present invention, a magnetic transducer having an inverted write element with a zero delta in pole tip width that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method of fabricating a magnetic transducer, the method comprising:

depositing a bottom pole layer on a substrate;

patterning a photo-resist layer having a desired width on a portion of the bottom pole layer, wherein the photo-resist layer shields the portion of the bottom pole layer from milling;

milling the bottom pole layer around the photo-resist layer to form an inverted bottom pole, the inverted bottom pole having upper and lower portions, the bottom pole upper portion being shielded by the photo-resist layer and having an upper portion width substantially equal to the desired width of the photo-resist layer, the bottom pole lower portion having a lower portion width, wherein the bottom pole upper portion width is less than the bottom pole lower portion width;

stripping away the photo-resist layer to expose the bottom pole upper portion;

depositing a planar alumina layer on both the bottom pole upper and lower portions;

polishing the planar alumina layer to again expose the bottom pole upper portion and form planar alumina layers on each side of the inverted bottom pole;

depositing a second alumina layer on the bottom pole upper portion and the planar alumina layers;

milling the second alumina layer such that the bottom pole upper portion is again exposed with second alumina layers being formed on each side of the bottom pole upper portion at a level above the bottom pole upper portion and on the planar alumina layers, the second alumina layers forming a recess having tapered side surfaces above the bottom pole upper portion;

depositing a write gap layer in the recess over the bottom pole upper portion and over the second alumina layers; and depositing a top pole layer over the write gap layer, wherein in the recess the top pole layer forms a top pole having a top pole main portion opposite to the bottom pole upper portion, the top pole main portion having a width which is substantially equal to the bottom pole upper portion width.

2. The method of claim 1 further comprising:

after polishing the planar alumina layer and prior to depositing the second alumina layer, depositing a lap strap layer on the bottom pole upper portion and the planar alumina layers; and using the lap strap layer as a mill stop while milling the second alumina layer.

3. The method of claim 1 further comprising:

after polishing the planar alumina layer and prior to depositing the second alumina layer, measuring the width of the bottom pole upper portion to determine whether the bottom pole upper portion width is within a given tolerance; and stripping the inverted bottom pole and the planar alumina layers away from the substrate if the bottom pole upper portion width is out of the given tolerance, and then repeating the steps of depositing a bottom pole layer, patterning a photo-resist layer, milling the bottom pole layer, stripping away the photo-resist layer, depositing a planar alumina layer, and polishing the planar alumina layer.

* * * * *